(12) United States Patent
Tatsuta (10) Patent No.: US 7,090,129 B2
(45) Date of Patent: Aug. 15, 2006

(54) CODE READER AND CARD TYPE RECORDING MEDIUM

(75) Inventor: Seiji Tatsuta, Hachioji (JP)

(73) Assignee: Olympus Corporation, Tokyo (JP)

( * ) Notice: Subject to any disclaimer, the term of this patent is extended or adjusted under 35 U.S.C. 154(b) by 100 days.

(21) Appl. No.: 10/853,727

(22) Filed: May 24, 2004

(65) Prior Publication Data

US 2004/0217172 A1 Nov. 4, 2004

Related U.S. Application Data

(63) Continuation of application No. PCT/JP02/12329, filed on Nov. 26, 2002.

(30) Foreign Application Priority Data

Nov. 30, 2001 (JP) .............................. 2001-367605

(51) Int. Cl.
G06K 7/00 (2006.01)
G06K 7/10 (2006.01)
(52) U.S. Cl. ....................... 235/435; 235/439; 235/470
(58) Field of Classification Search ........... 235/462.14, 235/470, 487, 435, 439, 494
See application file for complete search history.

(56) References Cited

U.S. PATENT DOCUMENTS 5,226,097 A 7/1993 Sakashita 5,432,329 A * 7/1995 Colgate et al. ............. 235/487
5,866,895 A 2/1999 Fukuda et al.
2003/0038180 A1 * 2/2003 Keay ........................... 235/469

FOREIGN PATENT DOCUMENTS

| EP | 0 996 093 A2 | 4/2000 |
|---|---|---|
| JP | 2-92562 U | 7/1990 |
| JP | 3-219763 A | 9/1991 |
| JP | 6-231466 A | 8/1994 |
| JP | 9-319846 A | 12/1997 |
| JP | 2001-184450 A | 7/2001 |

* cited by examiner

*Primary Examiner*—Steven S. Paik
*Assistant Examiner*—April Taylor
(74) *Attorney, Agent, or Firm*—Frishauf, Holtz, Goodman & Chick, P.C.

(57) ABSTRACT

A code reader has a predetermined guide groove and is configured to optically read an optically readable code from a predetermined side of a card type recording medium in which data is recorded as the optically readable code along the side, when the card type recording medium is abutted on the guide groove and is manually moved in a side direction along the guide groove. The code reader comprises an image input section configured to pick up an image of a moving code and process the image, and a data read section configured to read the data from the image which includes the code and is output from the image input section. A moving direction of the card type recording medium has a predetermined relation with characteristics concerning the image input section.

12 Claims, 10 Drawing Sheets

CODE READER AND CARD TYPE RECORDING MEDIUM

CROSS-REFERENCE TO RELATED APPLICATIONS

This is a Continuation Application of PCT application Ser. No. PCT/JP02/12329, filed Nov. 26, 2002, which was not published under PCT Article 21(2) in English.

This application is based upon and claims the benefit of priority from prior Japanese Patent Application No. 2001-367605, filed Nov. 30, 2001, the entire contents of which are incorporated herein by reference.

BACKGROUND OF THE INVENTION

1. Field of the Invention

The present invention relates to a code reader which reads data recorded as an optically readable code on a card type recording medium, and such card type recording medium.

2. Description of the Related Art

Figure 1:
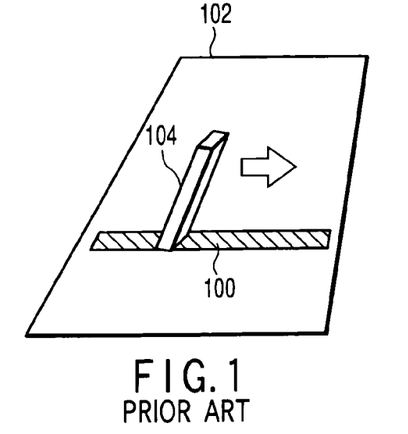
FIG. 1 is a diagram showing a code read state by manual movement of a conventional handy code reader.

As shown in FIG. 1, when a handy code reader 104 is manually moved on a recording medium 102 in which data is recorded as an optically readable code 100 to read the code 100, instability of a velocity or incorrectness of a reading position is caused because of manual movement, and it is necessary to solve this problem.

Therefore, in U.S. Pat. No. 5,866,895, a system has been proposed in which digital data is divided by block unit having predetermined information amounts and recorded in a recording medium to reproduce the data. In the above-described system, each block data divided in an appropriate size is read together with an address, and the block data is combined based on the address to reproduce the information. In a constitution in which the data is divided and recorded/reproduced for each block having an appropriate size in this manner, a moving velocity is not constant, or the reading position is also moved by incorrect manual operation. Even in this case, the system is very superior in that the data can be securely read.

Figure 2:
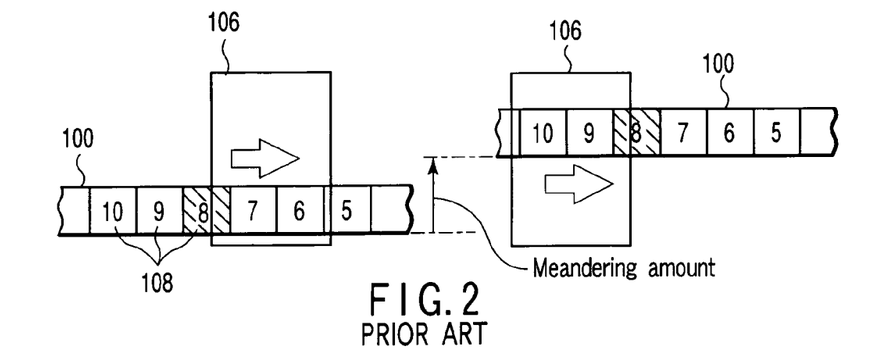
FIG. 2 is an explanatory view of meandering by the manual movement.
Figure 3:
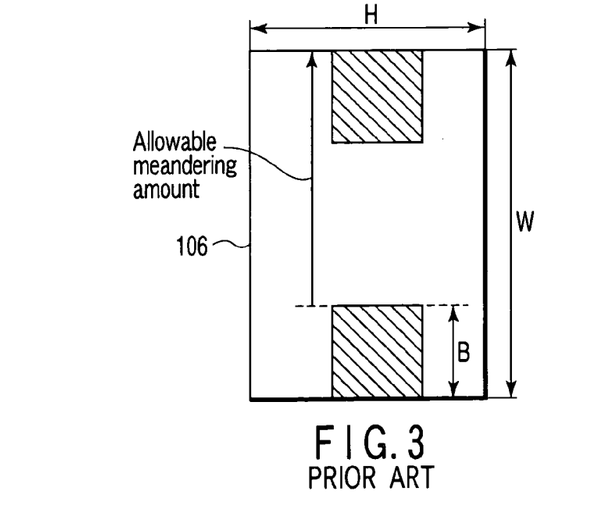
FIG. 3 is an explanatory view of an allowable meandering amount.

An effect of dividing and recording/reproducing the data for each block is high, but in this code reader 104, as shown in FIG. 2, with the movement, an image pick-up region 106 meanders with respect to the code. Therefore, when the region largely meanders, images of all blocks 108 are not correctly picked up, the data is sometimes missing, and attentions need to be paid to this case. In other words, an allowable meandering amount is a large factor that influences user's operability, and needs to be sufficiently considered in designing. Then, as shown in FIG. 3, when a longitudinal direction W of the image pick-up region 106 is matched with a meandering direction in the code reader 104 in which a size of the image pick-up region 106 on the medium is W×H (W>H), a larger allowable meandering amount (W−B) is secured.

Figure 4:
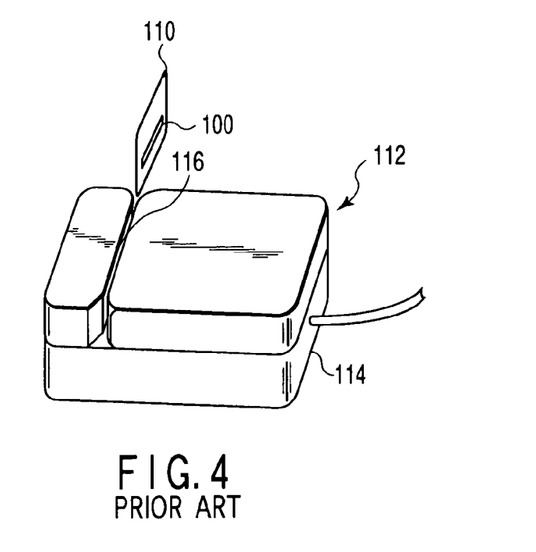
FIG. 4 is a perspective view showing a conventional card type recording medium and a conventional code reader.

Moreover, as a countermeasure against the meandering, constitutions such as a card type medium and code reader described in Jpn. Pat. Appln. KOKAI Publication No. 9-319846 are usable. As shown in FIG. 4, this is superior in that the code 100 is recorded along one side of a card type recording medium 110 on the medium, this medium is allowed to abut on a guide groove (=card guide 116) disposed in a housing 114 of a code reader 112, and moved along the groove, and accordingly the code 100 can be read without meandering the medium.

BRIEF SUMMARY OF THE INVENTION

According to a first aspect of the present invention, there is provided a code reader, having a predetermined guide groove, configured to optically read an optically readable code from a predetermined side of a card type recording medium in which data is recorded as the optically readable code along the side, when the card type recording medium is abutted on the guide groove and is manually moved in a side direction along the guide groove, the code reader comprising:

an image input section configured to pick up an image of a moving code and process the image; and a data read section configured to read the data from the image which includes the code and is output from the image input section, wherein a moving direction of the card type recording medium has a predetermined relation with characteristics concerning the image input section.

According to a second aspect of the present invention, there is provided a card type recording medium applied to a code reader, having a predetermined guide groove, configured to optically read an optically readable code from a predetermined side of a card type recording medium in which data is recorded as the optically readable code along the side, when the card type recording medium is abutted on the guide groove and is manually moved in a side direction along the guide groove, wherein the code reader comprises:
   an image input section configured to pick up an image of
      a moving code and process the image; and
   a data read section configured to read the data from the
      image which includes the code and is output from the
      image input section, and
a format of the code is defined in such a manner that characteristics concerning the reading of the data in the data read section have a predetermined relation with a moving direction of the card type recording medium and characteristics concerning the image input section.

According to a third aspect of the present invention, there is provided a card type recording medium applied to a code reader, having a predetermined guide groove, configured to optically read an optically readable code from a predetermined side of a card type recording medium in which data is recorded as the optically readable code along the side, when the card type recording medium is abutted on the guide groove and is manually moved in a side direction along the guide groove, wherein the code reader comprises:
   an image input section configured to pick up an image of
      a moving code and process the image; and
   a data read section configured to read the data from the
      image which includes the code and is output from the
      image input section,
the code comprises a plurality of blocks arranged in at least a moving direction of the card type recording medium,
   each of the blocks comprises an arrangement of:
   a data region including the data;
   a marker region including a marker to recognize the
      block; and
   a block address region including a block address to
      individually identify the blocks in accordance with a
      predetermined positional relation, and
a format of the code is defined so as to satisfy:

$N+1=W/B,$ where N denotes the number of blocks in which the data is readable in an image pick-up period, W denotes an image pick-up region width on the card type recording medium in the moving direction of the card type recording medium, and B denotes a block width on the card type recording medium in the moving direction of the card type recording medium.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the drawings.

Figure 5:
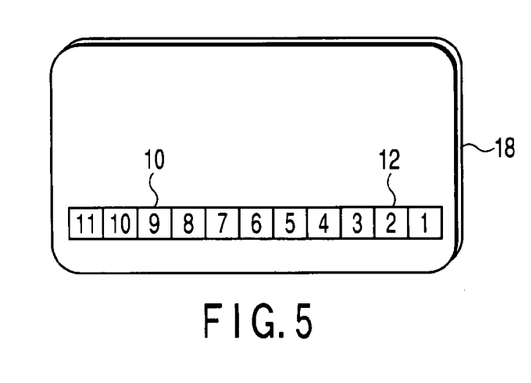
FIG. 5 is a diagram showing a card type recording medium according to one embodiment of the present invention.
Figure 6:
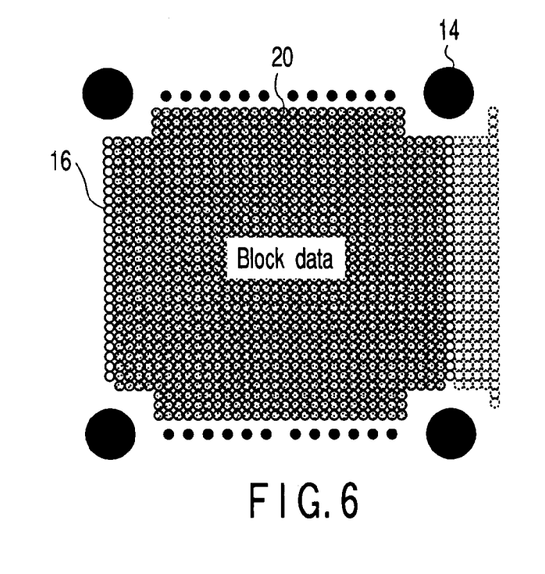
FIG. 6 is a diagram showing a configuration of a block of codes recorded in the card type recording medium.

In the present embodiment, in a code 10, as shown in FIGS. 5 and 6, information to be recorded is divided for each block 12, and recorded together with markers 14 and block addresses 16 which are reading indices along one side of a card type recording medium 18 on the medium formed of paper, plastic, metal or the like. It is to be noted that actual information to be recorded is included as data dots 20 represented by attributes "black", "white" in accordance with "1", "0" in each block 12.

Figure 7:
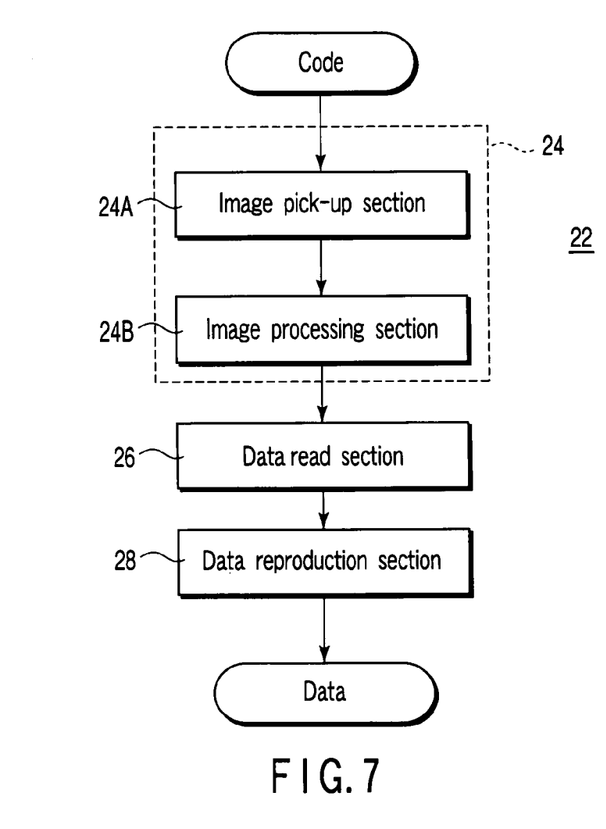
FIG. 7 is a block diagram of a code reader according to the embodiment of the present invention.
Figure 8:
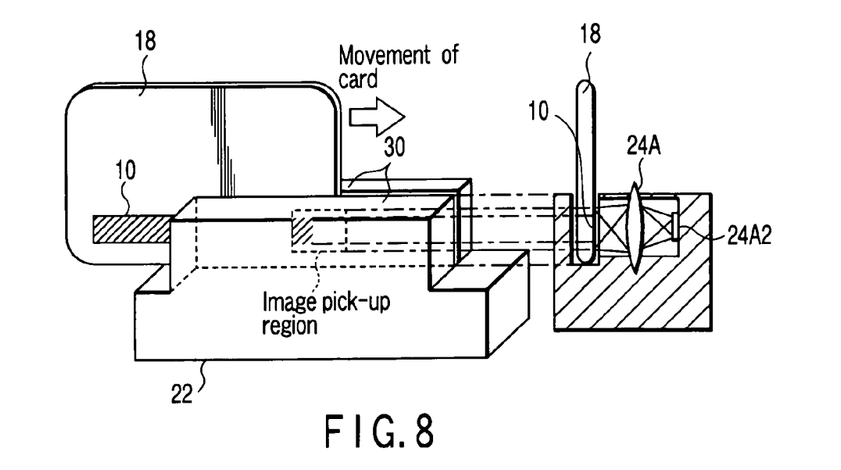
FIG. 8 is a diagram showing an appearance and cross section of the code reader.
Figure 9:
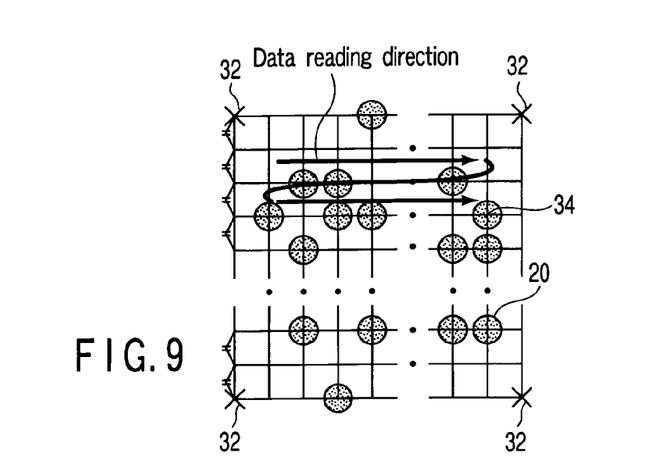
FIG. 9 is a diagram showing a reading position and a reading order of data dots.

Moreover, as shown in FIG. 7, a code reader 22 comprises an image input section 24, a data read section 26, and a data reproduction section 28, and the image input section 24 further comprises an image pick-up section 24A and an image processing section 24B. Here, as shown in FIG. 8, the image pick-up section 24A comprises an optical system 24A1, an image pick-up element 24A2 and the like. Furthermore, the code reader 22 includes card guides 30 which are guide grooves for stably sliding the card type recording medium 18.

Next, a function/effect of the present embodiment will be described.

First, in the image pick-up section 24A, an image of the code 10 shown in FIGS. 5 and 6 is picked up by image pick-up elements 24A2 such as a CCD through the optical system 24A1, and converted to an electric signal. Next, in the image processing section 24B, the picked-up code image is filtered to reduce the influence of blurs of the optical system 24A1, binarized to speed up the process, and stored in an image memory (not shown) constituted inside.

Next, in the data read section 26, the image memory is scanned to detect the markers 14 which are reading indices, a center of the marker is used as a read reference point, and a part inside four read reference points 32 constituting the block 12 is divided in lattices based on a block data format. Moreover, lattice points are used as data dot read points 34, and it is judged from a state of the image memory in each data dot read point 34 whether dots are white/black to read the block data. At this time, the block address 16 is also read, and the read block data is stored in a data memory configured inside the data read section 26 based on the block address 16. To read the block data, a method described in U.S. Pat. No. 5,866,895 or the like is usable.

Figure 10:
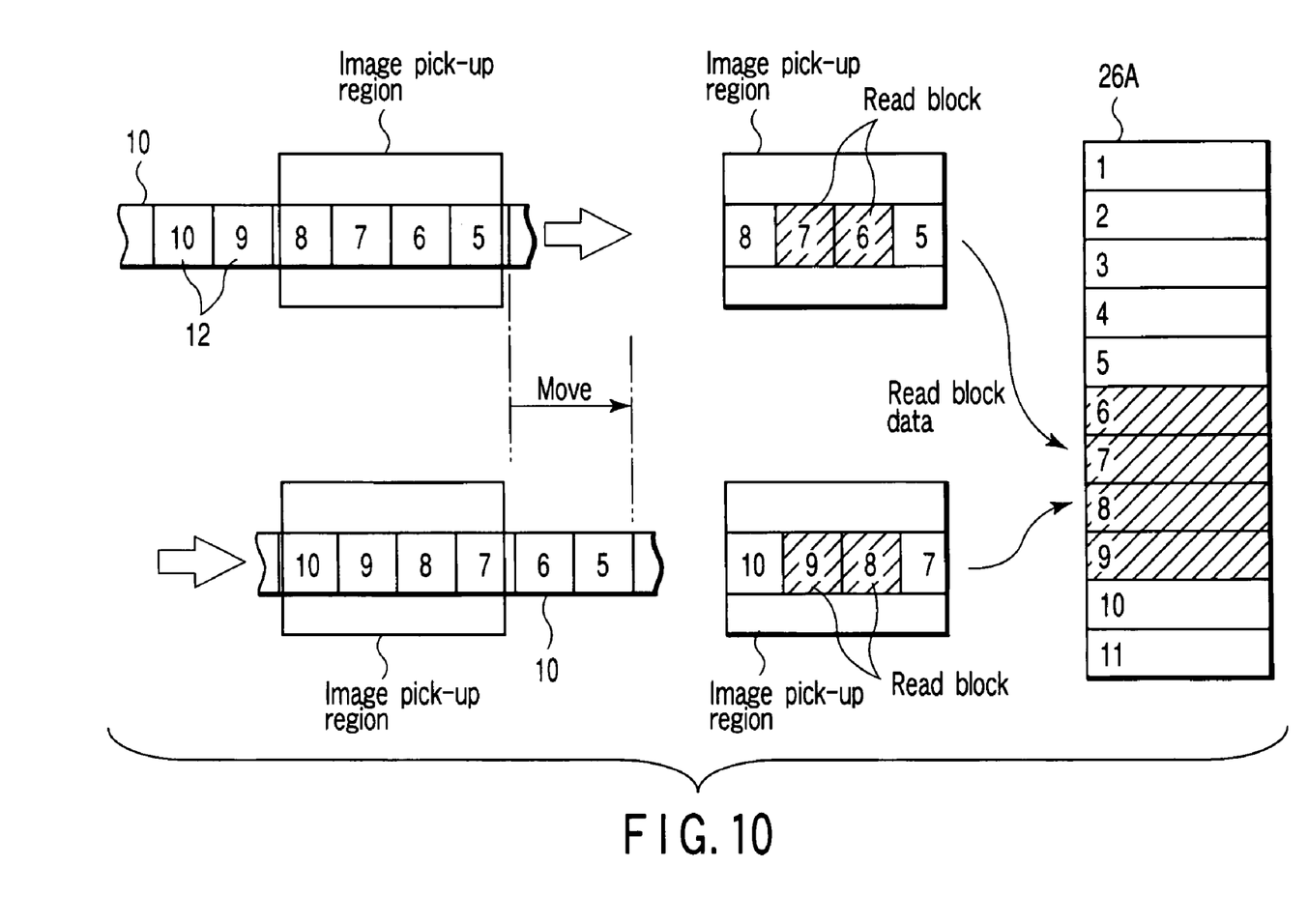
FIG. 10 is an explanatory view of the reading of the data by the movement of the code.

Moreover, when this series of processes are repeatedly performed in a certain image pick-up period, a continuously moving code image can be taken. That is, when the card type recording medium 18 is slid along the card guides 30, the code 10 moves with respect to the image pick-up section 24A. As shown in FIG. 10, the images of the blocks 12 are successively picked up, and all the data recorded in the code 10 is stored in a data memory 26A of the data read section 26.

In the data reproduction section 28, the block data stored in order of addresses in the data memory 26A in this manner is combined, and data subjected to modulation and error correction coding is subjected to corresponding demodulation and error correction to reproduce original data.

Figure 11:
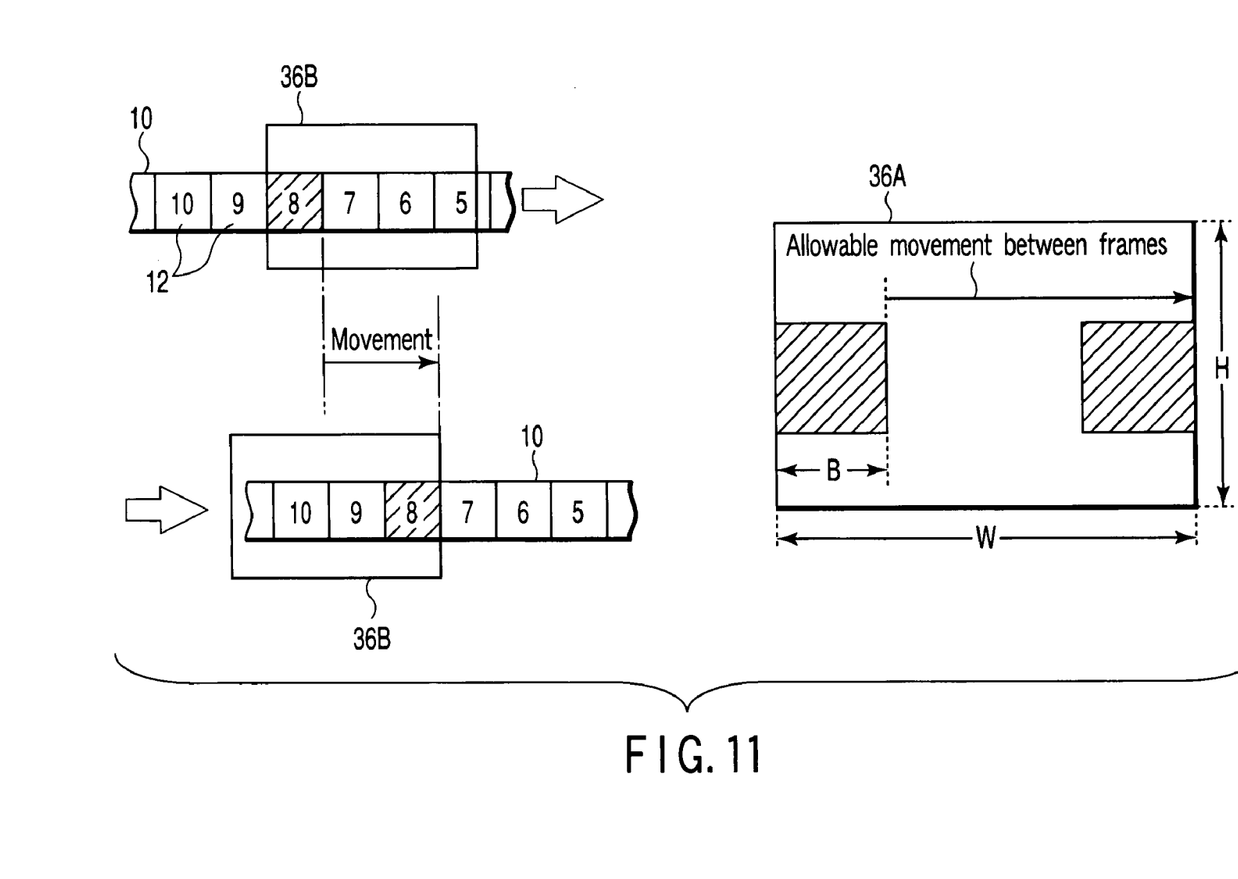
FIG. 11 is an explanatory view of an allowable moving velocity of the code.

Here, the allowable moving velocity of the code 10 (maximum velocity at which the code 10 can be moved with respect to the code reader 22 without causing a lack of block) is a factor that greatly influences user's operability, and needs to be sufficiently considered in designing. In a range which does not exceed the number of readable blocks in an image pick-up period in the data read section 26, as shown in FIG. 11, an allowable moving velocity V [mm/s] is obtained from a width (on the medium) W [mm] of an image pick-up region 36A of a code moving direction, a width (on the medium) B [mm] of the block 12 of a code moving direction, and an image pick-up period T [s], and represented by:

$$V=(W-B)/T \qquad (1).$$

Moreover, in the image pick-up element 24A2 such as the CCD, as shown by an image pick-up region (on the image pick-up element) 36B, in general, since the number of pixels or an aspect ratio differs lengthwise and breadthwise, the width of the image pick-up region 36A on the recording medium 18 also differs lengthwise and breadthwise in many cases. Here, the allowable moving velocity V is determined by the width of the image pick-up region 36A of the code moving direction from the above equation (1). Therefore, when W>H as in FIG. 11, and when the code 10 is designed to move in a W-direction as an image pick-up region longitudinal direction, the allowable moving velocity can be set to be higher.

For example, assuming that a pixel size of the image pick-up element 24A2 is 5.8×7.5 [μm], the pixel number is 480×286 [pix], and a magnification of the optical system 24A1 is 0.368, the image pick-up region 36A on the recording medium 18 indicates W=5.8×480/0.368=7565 [μm], H =7.5×286/0.368=5829 [μm]. Here, assuming that a block width (on the medium) B of the code moving direction is 2450 [μm], and an image pick-up period T is 1/30 [s], allowable moving velocities $V_W$, $V_H$ in a case where the code 10 is moved in W-direction, H-direction are as follows:

$$V_W=153.45 \text{ [mm/s]}$$

$$V_H=101.37 \text{ [mm/s]} \qquad (2)$$

Therefore, when the code 10 is designed to be moved in the W-direction, the allowable moving velocity can be set to be high by 50% as compared with a case where the code is designed to move in the H-direction, and this is superior in the operability for a user.

When the longitudinal direction of a rectangular image pick-up region of the image pick-up section 24A is matched with the moving direction of the code, the allowable moving velocity can be set to be higher as compared with the matching of the other direction (short direction).

Moreover, in a case where an operation clock frequency of the image pick-up element 24A2 is fixed, in general, when the image pick-up region 36A is enlarged n-times, time is required in scanning the screen n-times, and therefore the image pick-up period T is also n-times. An allowable moving velocity V' at this time is represented by the following equation:

$$V' = (nW - B)/(nT) \qquad (3)$$
$$= (W - B/n)/T.$$

In comparison with the above equation (1), since B→B/N, a relation of V'>V is established. That is, an image pick-up region width of the code moving direction is designed to be large. Accordingly, when an image pick-up period is lengthened, the allowable moving velocity can be set to be higher.

Figure 12:
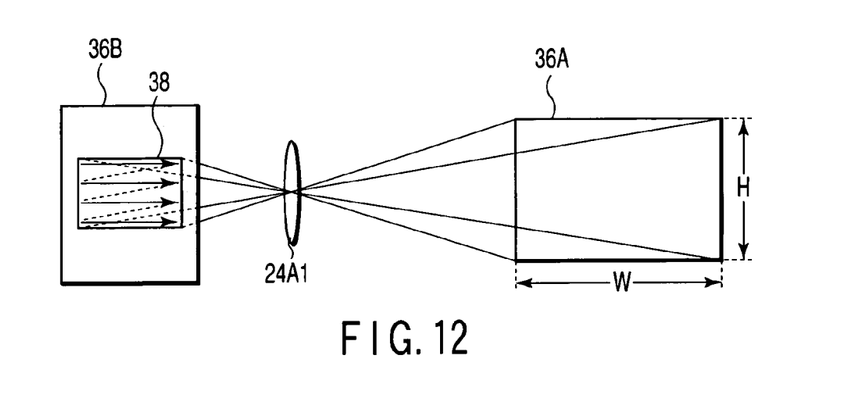
FIG. 12 is an explanatory view of an effective image pick-up region in an X-Y address type image pick-up element.

Like an CMOS image sensor, there is an X-Y address type image pick-up element in which an optional rectangular image pick-up region can be set in the image pick-up region 36B of the image pick-up element 24A2. In the element, as shown in FIG. 12, an effective image pick-up region 38 can be freely set. Therefore, an effective image pick-up region width on the side crossing the code moving direction at right angles is narrowed to an allowable meandering limit of the code 10. On the other hand, the effective image pick-up region width of the code moving direction is designed as broad as possible. Accordingly, even when an operation clock frequency is fixed, the allowable moving velocity can be increased only by changing a method of designing the region.

Figure 13:
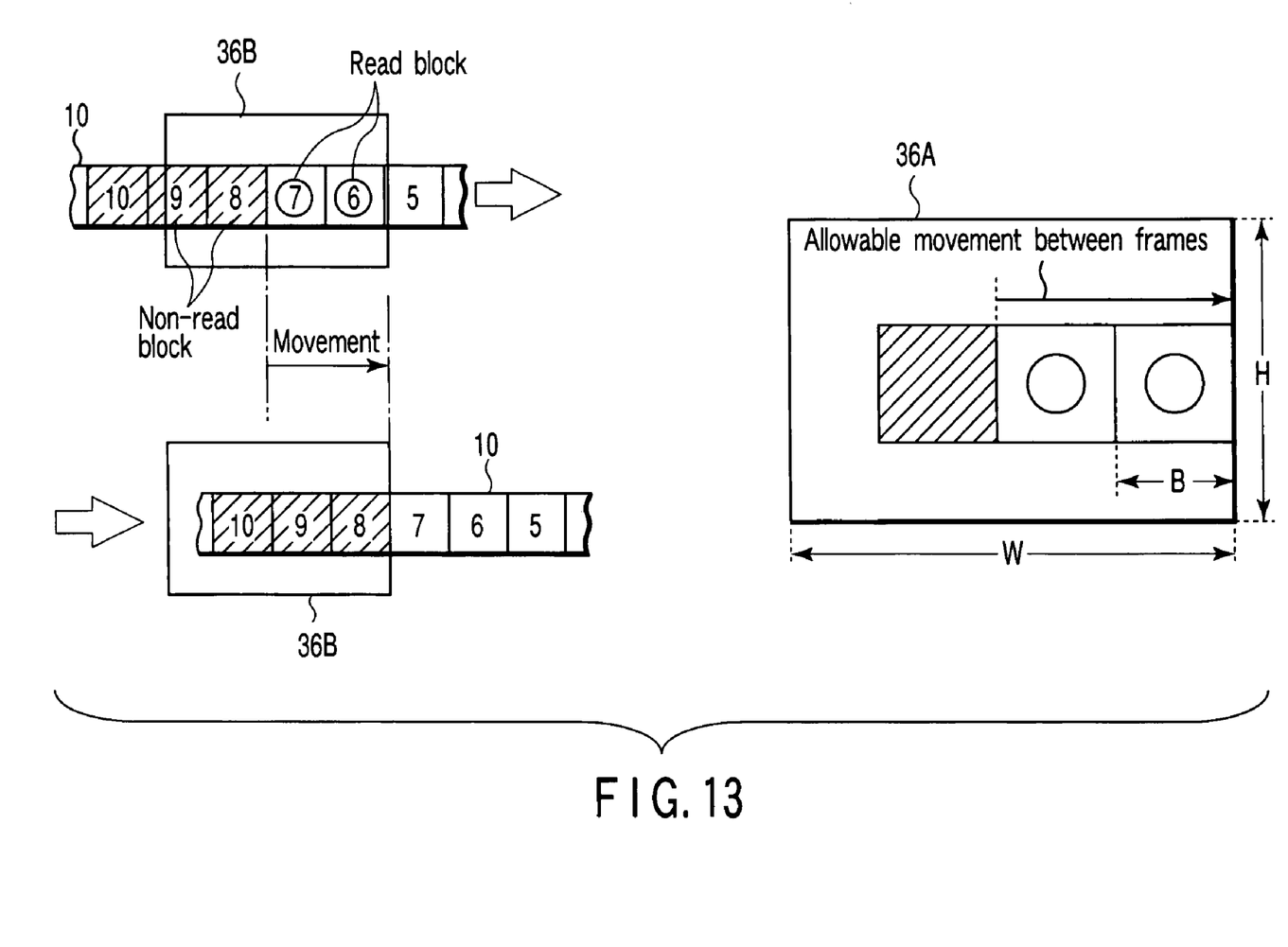
FIG. 13 is an explanatory view of the allowable moving velocity of the code in accordance with the number of blocks which can be read in an image pick-up period.

However, when the number of readable blocks in the image pick-up period is exceeded, even the block whose image has been picked up cannot be read sometimes. In this case, movement is limited to the processable blocks between frames. For example, as shown in FIG. 13, when the number N of readable blocks in the image pick-up period is N=2, the movement is limited only to two blocks between the frames. That is, in this case, from the number N of readable blocks in the image pick-up period, the block width (on the medium) B [mm] in the code moving direction, and the image pick-up period T [s], the allowable moving speed V [mm/s] is represented by:

$$V=N \cdot B/T \qquad (4).$$

In this manner, the block whose image has been picked up but which cannot be read is generated, and the image memory or the image processing is wasted. Conversely, when a reading capability is sufficient but the number of image pick-up blocks is small; a processing capability is wasted.

Therefore, it is efficient to select the size of the block 12, the magnification of the optical system 24A1, the size of the image pick-up element 24A2, the number of pixels and the like in such a manner that the allowable moving velocity determined by the above equation (1) substantially matches that determined by the above equation (4). That is, the following relation is preferably designed to be established from the equations (1) and (4):

$$N+1=W/B \qquad (5).$$

In this manner, the blocks 12 whose images have been picked up can be all read just in the image pick-up period, thus efficient processing is possible.

For example, to set the pixel size of the image pick-up element 24A2 in the code moving direction to 8 μm, set a dot diameter to 70 μm, and sample a dot with three pixels, assuming that the magnification of the optical system 24A1 is 24/70=0.343, the number of blocks readable in the image pick-up period is two, and the block width in the code moving direction is 35 dots (35×70=2450 μm), the number of pixels P of the image pick-up element 24A2 in the code moving direction is obtained from the above equation (5) as follows:

$$P \times 8/0.343=(2+1) \times 2450$$

$$P=315 \qquad (6),$$

and the efficiency is satisfactory, when about 315 pixels are designed.

In this manner, an effective pixel number (the number of pixels for actual use in processing among all the pixels of the image pick-up element 24A2) of the image pick-up element 24A2 can also be designed so as to satisfy the above equation (5). Conversely, it is also possible to set the magnification or the dot diameter of the optical system 24A1, the number of dots of the block, the number of readable blocks in the image pick-up period, the image pick-up period and the like from the other conditions.

Figure 14A:
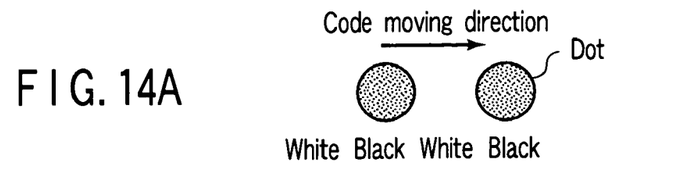
FIG. 14A is a diagram showing the code.
Figure 14B:
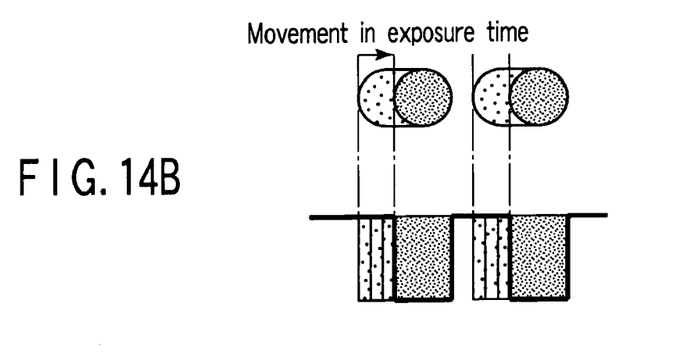
FIG. 14B is a diagram showing a concentration cross section.
Figure 14C:
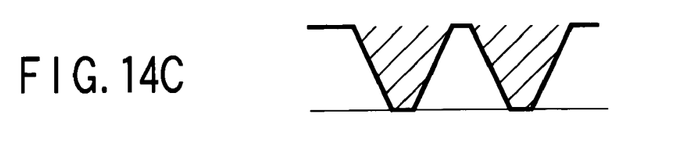
FIG. 14C is a diagram showing an output of the image pick-up element.
Figure 14D:
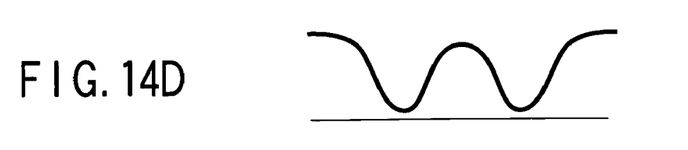
FIG. 14D is a diagram showing an image pick-up element output including a blur of an optical system.
Figure 14E:
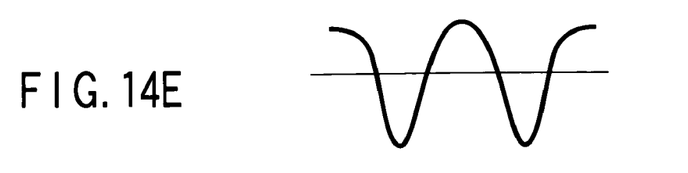
FIG. 14E is a diagram showing a filter output of a one-dimensional high-pass emphasis filter process in a code moving direction.
Figure 14F:
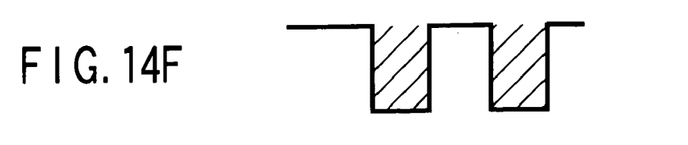
FIG. 14F is a diagram showing a binarized signal of the filter output.
Figure 15:
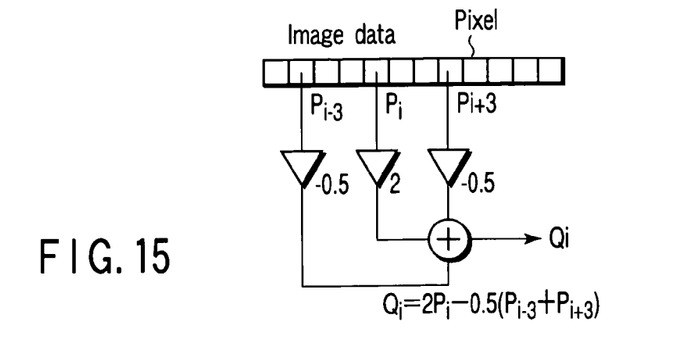
FIG. 15 is a diagram showing an example of the one-dimensional filter.

Moreover, when the code 10 moves within an exposure time of the image pick-up element 24A2 as shown in FIG. 14A, during the moving, a white/black level change of the dot shown in FIG. 14B is convolved, and output as shown in FIG. 14C. This is a so-called vibration but, actually, blurring of the optical system 24A1 is added, and the output of the image pick-up element 24A2 is as shown in FIG. 14D. When a signal deteriorated in this manner is used in reading, an error is caused. Therefore, for example, when a one-dimensional high-pass emphasis filter process is performed by a one-dimensional filter in the code moving direction in the image processing section 24B as shown in FIG. 15, a waveform is shaped as shown in FIG. 14E. When the signal obtained in this manner is binarized, an influence of the vibration by the code movement can be reduced, as shown in FIG. 14F.

This vibration reducing filter process can be performed by the image processing in the image input section 24. When a direction 40 of the image processing is matched with a code moving direction 42 as shown in FIG. 16, the vibration reducing filter process can be easily performed in this manner.

Figure 16:
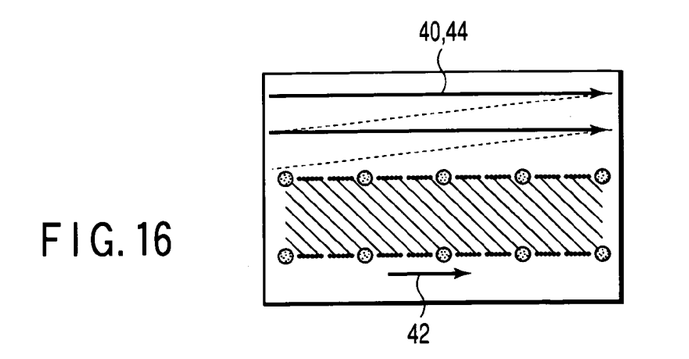
FIG. 16 is a diagram showing a relation among an image processing direction or an image reading direction and the code moving direction.

Moreover, since the image processing can be performed at a high velocity by the matching with an image reading direction, as shown in FIG. 16, an image reading direction 44 is designed so as to match the code moving direction 42, an efficient vibration reducing filter process is possible. Moreover, when the high-pass emphasis filter process is further performed in order to reduce the blurring of the optical system 24A1, these processes are combined, and the filter process of a pass can suffice.

Figure 17:
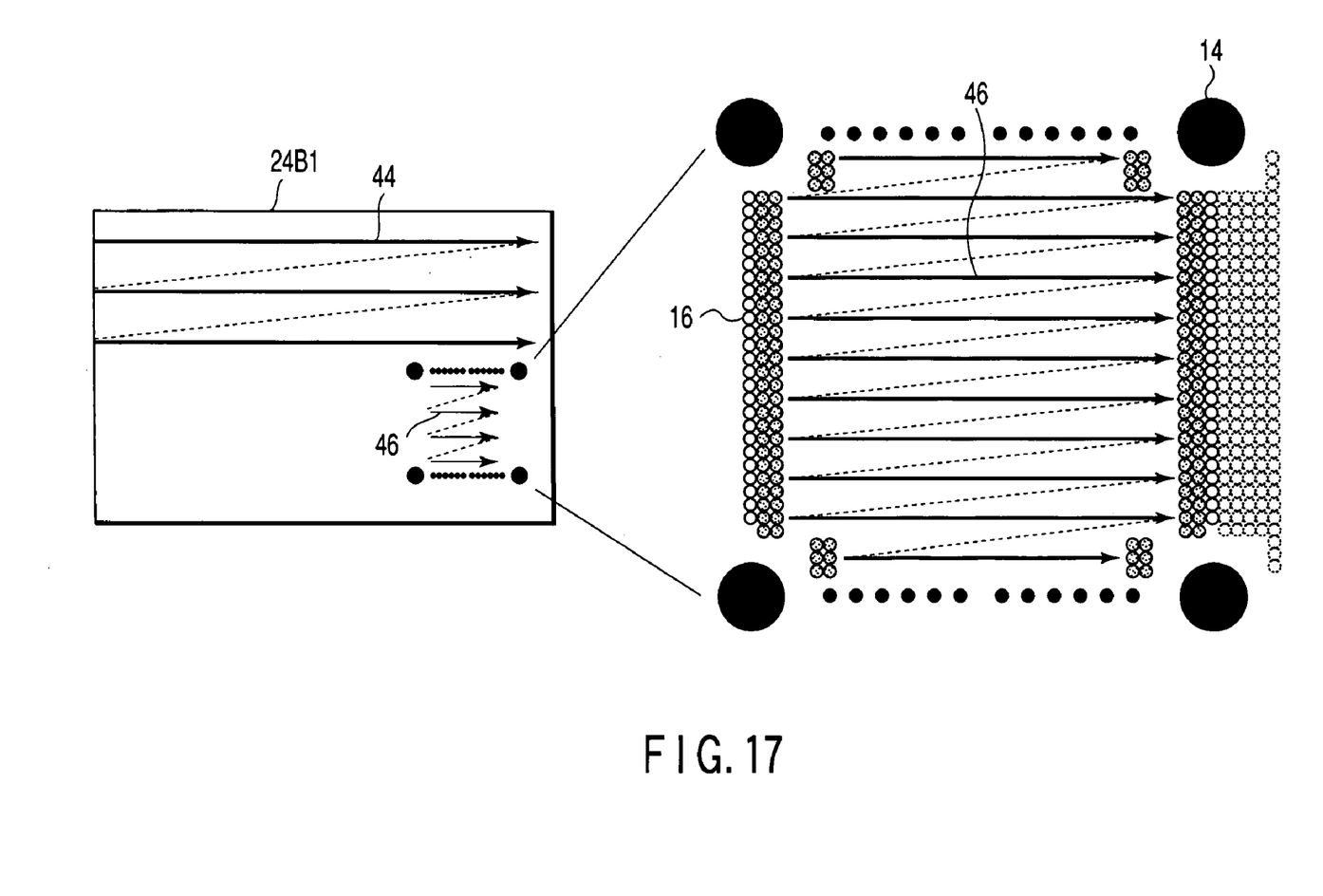
FIG. 17 is a diagram showing a relation between the image reading direction and a data reading direction.

Moreover, in general, the block data in each block 12 is recorded in order of raster in the block as shown in FIG. 17. On the other hand, a plurality of pixels continuing in the image reading direction 44 can be integrated and read once by a word unit from an image memory 24B1. Therefore, a data reading direction 46 is designed to substantially match the image reading direction 44 in the image processing section 24B and/or the data read section 26. Accordingly, the number of image memory accesses at the time of the reading of the block data is reduced, and the reading can be speeded up.

Figure 18:
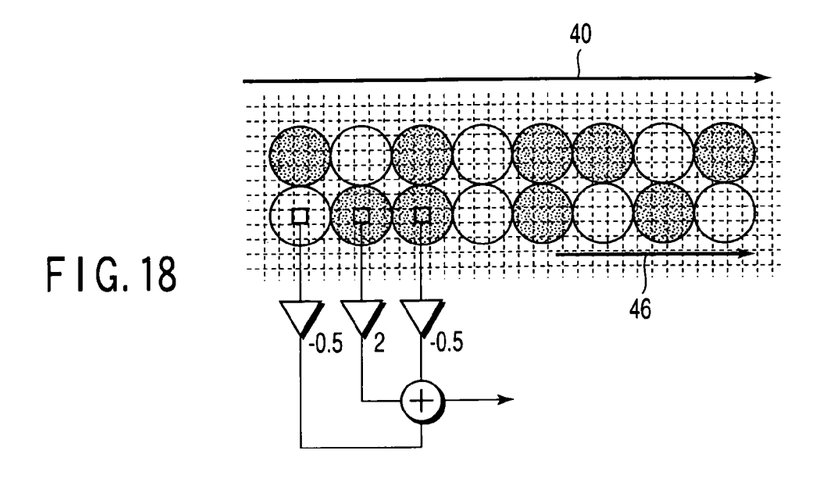
FIG. 18 is a diagram showing a dot emphasis filter.
Figure 19:
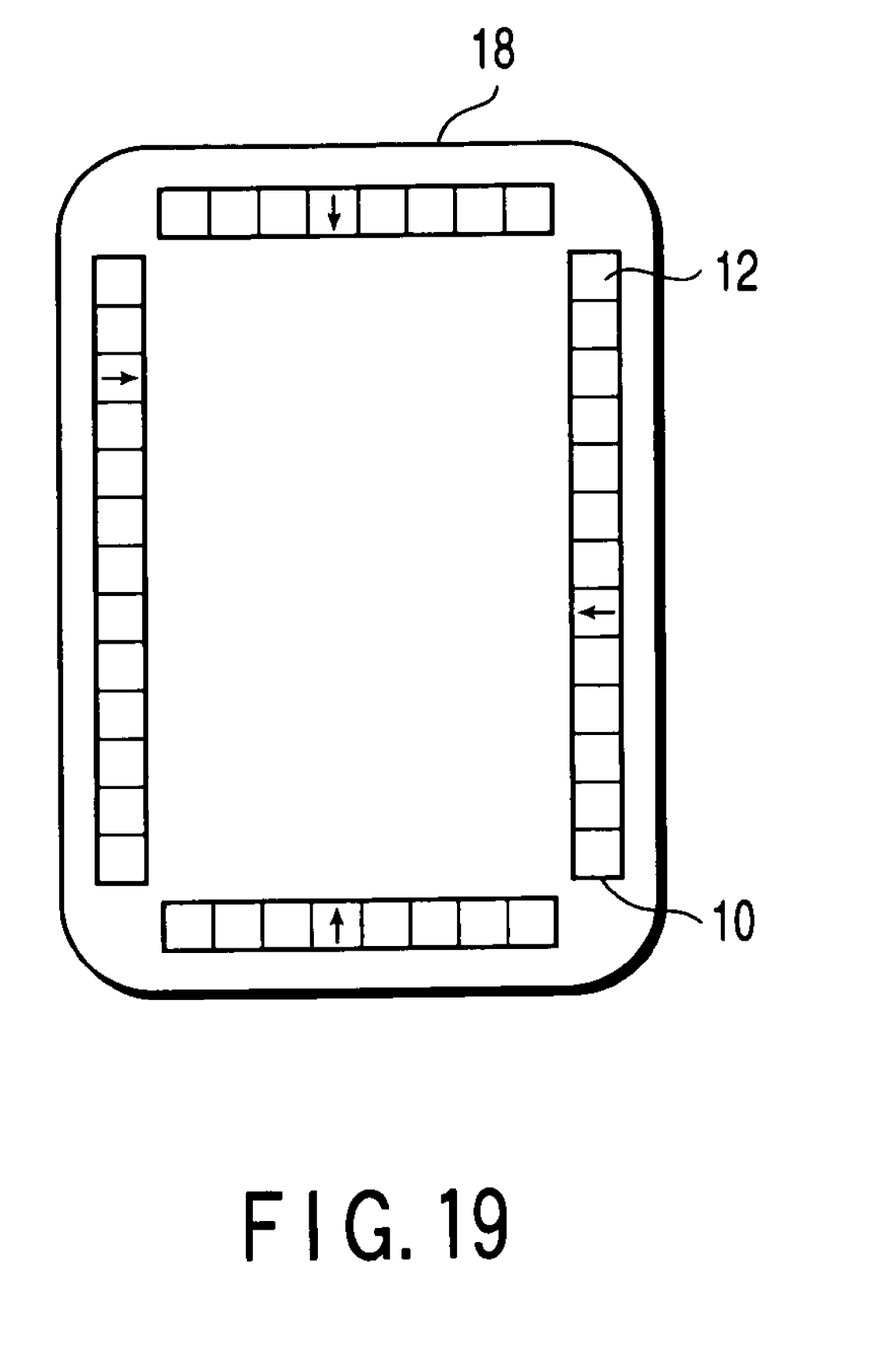
FIG. 19 is a diagram showing a modification of the card type recording medium according to the embodiment.

Moreover, in this case, to further secure the reading of the block data, the one-dimensional filter process is easily performed for dot emphasis in accordance with modulation of the block data. For example, the block data is modulated in such a manner that three or more dots are prevented from continuing in order to facilitate the detection of the markers 14, which are the reading indices of the block 12, and thereafter recorded. In this case, by the image processing in which a cosine equalization filter having one dot between taps in an arrangement direction of data as shown in FIG. 18 is applied to the whole image, presence/absence of the dot is emphasized, and reading errors at the time of the reading of the block data can be reduced.

That is, when the code moving direction 42 is matched with the direction 40 of the image processing and/or the direction 44 of the image reading, further with the reading direction 46 of the data, it is possible to read the data securely and easily.

When the longitudinal direction of the image pick-up region 36A or the image reading direction 44 is matched with the code moving direction 42, or the image reading direction 44 is matched with the data reading direction 46 in this manner, the allowable moving velocity can be increased, and the operability can be enhanced without increasing an operation clock frequency of the image pick-up element 24A2 or increasing the pixel number of the image pick-up element 24A2.

The present invention has been described above based on the embodiment, but the present invention is not limited to the above-described embodiment and, needless to say, various modifications or applications are possible in the scope of the present invention.

For example, a code may also include all the blocks configuring the code in the image pick-up region. In this case, the data reproduction section 28 is not required.

Moreover, the block shown in FIG. 6 is usually configured to be read even when the image of the block is rotated and picked up, but the blocks are arranged/recorded beforehand so that upper edges of the blocks are constantly directed toward the center of the card as shown in FIG. 18 (upward directions of the blocks are shown by arrows in the figure). In this case, even when any side abutting on the card guide 30 is read, a vertical direction of the code 10 is usually constant on the reader, it is therefore unnecessary to identify a rotation direction of the block, and thus a further speeding-up is possible.

Furthermore, the present invention is also applicable to other optically readable codes, in addition to the code shown in FIG. 6.

Here, the scope of the present invention is summarized as follows.

(1) A code reader, having a predetermined guide groove, configured to optically read an optically readable code from a predetermined side of a card type recording medium in which data is recorded as the optically readable code along the side, when the card type recording medium is abutted on the guide groove and is manually moved in a side direction along the guide groove, the code reader comprising:

an image input section configured to pick up an image of a moving code and process the image; and a data read section configured to read the data from the image which includes the code and is output from the image input section, wherein a moving direction of the card type recording medium has a predetermined relation with characteristics concerning the image input section.

Here, the image input section corresponds to the image input section 24 in FIG. 7, and the image input section 24 further comprises the image pick-up section 24A which picks up the image of the code, and the image processing section 24B to subject the image processing to the code image whose image has been picked up.

Moreover, the characteristics of the image input section mentioned herein include the arrangement of the image pick-up screen in the image pick-up section 24A, effective image pick-up region, screen scanning direction, image reading direction, image processing direction in the image processing section 24B, image reading direction and the like. These characteristics are matched with the moving direction of the card type recording medium 18.

That is, the image input section 24 optically reads the code 10 recorded on the moving card type recording medium 18 to apply appropriate image processing, and the data read section 26 reads the data from the image obtained in this manner.

By this constitution (1), a lack of data, an error by vibration and the like caused by the movement of the card type recording medium at the data reading time are prevented, and the user's operability can be enhanced without complicating the process of the code reader.

(2) The code reader according to (1), wherein the image input section includes an image pick-up section configured to pick up the moving code, the characteristics concerning the image input section are characteristics concerning an aspect ratio of a rectangular image pick-up region set beforehand in the image pick-up section, and the predetermined relation includes a relation which a moving direction of the card type recording medium is matched with a longitudinal direction of the image pick-up region.

Here, the image pick-up section corresponds to the image pick-up section 24A in FIG. 7, and has a preset rectangular image pick-up region. Furthermore, as shown in FIG. 11, the moving direction of the card type recording medium 18 is configured to match the longitudinal direction of the image pick-up region 36B.

That is, as shown in FIG. 11, the image pick-up section 24A picks up the image of the code moving in the longitudinal direction of the preset rectangular image pick-up region 36B.

By this constitution (2), the allowable moving velocity of the card type recording medium can be set to be high, and it is possible to enhance the user's operability without complicating the process of the code reader.

(3) The code reader according to (2), wherein the image pick-up section includes an X-Y address type image pick-up element capable of optionally setting the rectangular image pick-up region in its own image pick-up region.

Here, the image pick-up section 24A comprises the X-Y address type image pick-up element such as the CMOS image sensor. Moreover, as shown in FIG. 12, the optional rectangular image pick-up region (effective image pick-up region 38) is set in the image pick-up region 36B owned by the element itself.

That is, as shown in FIG. 12, the image pick-up section 24A picks up the effective image only in the preset rectangular region to output the corresponding image data.

By the constitution (3), the image pick-up section picks up the image of only a region having a necessary position and size, a waste of image processing or image memory is eliminated, and efficient processing is possible.

(4) The code reader according to (2), wherein the image pick-up section includes a solid image pick-up element having a rectangular image pick-up region, and the rectangular image pick-up region preset in the image pick-up section is the rectangular image pick-up region owned by the solid image pick-up element.

Here, the image pick-up section 24A includes the rectangular image pick-up region, and is constituted to pick up the image using the whole surface as an effective region.

By the constitution (4), the image pick-up element is effectively used, and a trouble of setting the effective region can be saved.

(5) The code reader according to (1), wherein the characteristics concerning the image input section include a direction of the image processing in the image input section, and the predetermined relation includes a relation which a moving direction of the card type recording medium is matched with the direction of the image processing.

Here, as shown in FIG. 16, the image processing section 24B is configured in such a manner that the direction of the image processing matches the moving direction of the code.

That is, the image processing section 24B performs a process for restoring the deterioration of the image caused by the moving of the code 10 along the moving direction of the code 10.

By the constitution (5), the influence of the vibration caused by the moving of the code can be easily reduced, and it is possible to suppress the reading error of the data.

(6) The code reader according to (5), wherein the image processing in the image input section includes a one-dimensional filter process, and the predetermined relation includes a relation which a moving direction of the card type recording medium is matched with a direction of the one-dimensional filter process.

Here, the image processing section 24B includes the one-dimensional filter process shown in FIG. 15, and is configured in such a manner that the direction of the one-dimensional filter process matches the moving direction of the code.

That is, the image processing section 24B performs the one-dimensional filter process to restore the deterioration of the image caused by the moving of the code 10 along the moving direction of the code 10.

By the constitution (6), the influence of the vibration caused by the moving of the code can be easily reduced, and it is possible to suppress the reading error of the data.

(7) The code reader according to (5), wherein the image processing in the image input section includes image reading from a memory after image data corresponding to a picked-up image is stored once in the memory, and the predetermined relation includes a relation which a moving direction of the card type recording medium is matched with a direction of the image reading.

Here, as shown in FIG. 16, the image processing section 24B is configured in such a manner that the reading direction of the image matches the moving direction of the code.

That is, the image processing section 24B successively reads the image data stored once in the image memory 24B1, and applies predetermined processing to the image data along the reading direction.

By the constitution (7), the influence of the vibration caused by the moving of the code can be easily reduced even with respect to the image data stored once in the image memory, and it is possible to suppress the reading error of the data.

(8) The code reader according to any of (1) to (7), wherein the moving direction of the card type recording medium, the characteristics concerning the image input section, and the characteristics concerning the reading of the data in the data read section have a predetermined relation with one another.

The characteristics of the data read section mentioned herein include the reading direction of the data and the like, and these characteristics are matched with the moving direction of the card type recording medium and the characteristics of the image input section.

That is, as shown in FIG. 17, the data read section 26 reads the code data along the reading direction of the image.

By the constitution (8), the number of image memory accesses at the block data reading time is reduced, and the reading can be speeded up.

(9) The code reader according to (8), wherein the characteristics concerning the image input section include a direction of the image processing in the image input section, the characteristics concerning the reading of the data in the data read section include a reading direction of the data, and the predetermined relation includes a relation which a moving direction of the card type recording medium, the direction of the image processing, and the reading direction of the data are matched with one another.

Here, as shown in FIG. 18, the image processing section 24B is configured in such a manner that the direction of the image processing matches the reading direction of the data. The data is modulated so as to prohibit three dots from continuing.

That is, the image processing section 24B successively subjects the image data to a dot emphasis process along the reading direction of the image.

By the constitution (9), the image processing for emphasizing the dots corresponding to the modulation of the data is easily performed, and the data can be securely read.

(10) The code reader according to (1), wherein a plurality of blocks are arranged in at least a moving direction of the card type recording medium to configure the code, each block comprises an arrangement of:

a data region including the data;

a marker region including a marker to recognize the block; and a block address region including a block address to identify the blocks individually in accordance with a predetermined positional relation, and the predetermined relation is represented by:

$$N+1 = W/B$$

where N denotes the number of blocks from which the data is readable in an image pick-up period, W denotes an image pick-up region width on the card type recording medium in a moving direction of the card type recording medium, and B denotes a block width on the card type recording medium in the moving direction of the card type recording medium.

Here, N, W, B determined by the effective pixel number of the image pick-up element 24A2, the magnification of the optical system 24A1, the dot diameter of the code, the dot number of the block, the number of readable blocks in the image pick-up period, the image pick-up period and the like are configured to satisfy the above equation.

By the constitution (10), the blocks whose images have been picked up in the image pick-up screen can be all read just in the image pick-up period, there is no excess or deficiency between a reading rate of the block and the number of blocks whose images are to be picked up in the screen, and therefore efficient processing is possible.

(11) A card type recording medium applied to a code reader, having a predetermined guide groove, configured to optically read an optically readable code from a predetermined side of a card type recording medium in which data is recorded as the optically readable code along the side, when the card type recording medium is abutted on the guide groove and is manually moved in a side direction along the guide groove, wherein the code reader comprises:

an image input section configured to pick up an image of a moving code and process the image; and a data read section configured to read the data from the image which includes the code and is output from the image input section, and a format of the code is defined in such a manner that characteristics concerning the reading of the data in the data read section have a predetermined relation with a moving direction of the card type recording medium and characteristics concerning the image input section.

Here, the image input section corresponds to the image input section 24 in FIG. 7, and the image input section 24 further comprises the image pick-up section 24A to pick up the image of the code and the image processing section 24B to subject the picked-up code image to the image processing.

Moreover, the characteristics of the image input section mentioned herein include the arrangement of the image pick-up screen in the image pick-up section 24A, effective image pick-up region, screen scanning direction, image reading direction, image processing direction in the image processing section 24B, image reading direction and the like, and these characteristics are matched with the moving direction of the card type recording medium 18 to define the format of the code 10.

By the constitution (11), the lack of data, error by vibration and the like caused by movement of the card type recording medium at the data reading time are prevented, and the user's operability can be enhanced without complicating the process of the code reader.

(12) The card type recording medium according to (11), wherein the characteristics concerning the image input section include a direction of the image processing in the image input section, the characteristics concerning the reading of the data in the data read section include a reading direction of the data, and the format of the code is defined in such a manner that a moving direction of the card type recording medium, the direction of the image processing, and the reading direction of the data match one another.

Here, as shown in FIG. 18, the code 10 is defined in such a manner that the moving direction of the card type recording medium and the direction of the image processing in the image processing section 24B match the reading direction of the data. The data is modulated so as to prohibit three consecutive dots.

By the constitution (12), the image processing for dot emphasis corresponding to the modulation of the data can be easily performed, and the data can be securely read.

(13) A card type recording medium applied to a code reader, having a predetermined guide groove, configured to optically read an optically readable code from a predetermined side of a card type recording medium in which data is recorded as the optically readable code along the side, when the card type recording medium is abutted on the guide groove and is manually moved in a side direction along the guide groove, wherein the code reader comprises:

an image input section configured to pick up an image of a moving code and process the image; and a data read section configured to read the data from the image which includes the code and is output from the image input section, the code comprises a plurality of blocks arranged in at least a moving direction of the card type recording medium, each of the blocks comprises an arrangement of:

a data region including the data;

a marker region including a marker to recognize the block; and a block address region including a block address to individually identify the blocks in accordance with a predetermined positional relation, and a format of the code is defined so as to satisfy:

$$N+1=W/B,$$

where N denotes the number of blocks in which the data is readable in an image pick-up period, W denotes an image pick-up region width on the card type recording medium in the moving direction of the card type recording medium, and B denotes a block width on the card type recording medium in the moving direction of the card type recording medium.

Here, N, W, B determined by the effective pixel number of the image pick-up element 24A2, the magnification of the optical system 24A1, the dot diameter of the code, the dot number of the block, the number of readable blocks in the image pick-up period, the image pick-up period and the like are configured to satisfy the above equation.

By the constitution (13), the blocks whose images have been picked up in the image pick-up screen can be all read just in the image pick-up period, there is no excess or deficiency between the reading rate of the block and the number of blocks whose images are to be picked up in the screen, and therefore the efficient processing is possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code reader which has a predetermined guide groove and is configured to optically read an optically readable code from a predetermined side of a card recording medium on which data is recorded as the optically readable code along the side, when the card recording medium is inserted in the guide groove and is manually moved in a direction along the guide groove, the code reader comprising:

an image input section configured to pick up an image of the code as it is moved and to process the image; and a data read section configured to read the data from the image which includes the code and is output from the image input section;

wherein the image input section includes an image pick-up section configured to pick up the image of the moving code, and wherein a moving direction of the card recording medium is matched with a longitudinal direction of an image pick-up region preset in the image pick-up section.

2. The code reader according to claim 1, wherein the image pick-up section includes an X-Y address image pickup element having a pick-up region in which the rectangular image pick-up region can be arbitrarily set.

3. The code reader according to claim 1, wherein the image pick-up section includes a solid image pick-up element having a rectangular image pick-up region, and wherein the rectangular image pick-up region preset in the image pick-up section is the rectangular image pick-up region of the solid image pick-up element.

4. The code reader according to claim 1, wherein the moving direction of the card recording medium is matched with a direction of the image processing.

5. The code reader according to claim 4, wherein the image processing includes a one-dimensional filter process, and the moving direction of the card recording medium is matched with a direction of the one-dimensional filter process.

6. The code reader according to claim 4, wherein the image processing includes image reading from a memory after image data corresponding to a pick-up image is stored once in the memory, and the moving direction of the card recording medium is matched with a direction of the image reading.

7. The code reader according to claim 1, wherein the moving direction of the card recording medium is matched with a direction of the reading of the data in the data read section.

8. The code reader according to claim 7, wherein the moving direction of the card recording medium is matched with a the direction of the image processing.

9. The code reader according to claim 1, wherein the code is arranged in a plurality of blocks arranged in at least the moving direction of the card recording medium;

wherein each block comprises an arrangement of:
a data region including the data;
a marker region including a marker to recognize the block; and
a block address region including a block address to identify the block individually in accordance with a predetermined positional relationship; and wherein the predetermined positional relationship is configured to satisfy:

$$N+1=W/B$$

where:
N denotes number of blocks from which the data is readable during an image pick-up period,
W denotes an image pick-up region width on the card recording medium in the moving direction of the card recording medium, and
B denotes a block width on the card recording medium in the moving direction of the card recording medium.

10. A card recording medium applied to a code reader, wherein the code reader has a predetermined guide groove and is configured to optically read an optically readable code from a predetermined side of a card recording medium in which data is recorded as the optically readable code along the side, when the card recording medium is inserted in the guide groove and is manually moved in a direction along the guide groove, wherein the code reader comprises:
an image input section configured to pick up an image of the code as it is moved and to process the image; and
a data read section configured to read the data from the image which includes the code and is output from the image input section, wherein the code comprises a plurality of blocks arranged in at least a moving direction of the card recording medium, and each of the blocks comprises an arrangement of:
a data region including the data;
a marker region including a marker to recognize the block; and
a block address region including a block address to identify the block individually in accordance with a predetermined positional relationship; and wherein a format of the code is defined so as to satisfy:

$$N+1=W/B,$$

where:
- N denotes a number of blocks in which the data is readable during an image pick-up period,
- W denotes an image pick-up region width on the card recording medium in the moving direction of the card recording medium, and
- B denotes a block width on the card recording medium in the moving direction of the card recording medium.

11. A code reader which has a predetermined guide groove and is configured to optically read an optically readable code from a predetermined side of a card recording medium on which data is recorded as the optically readable code along the side, when the card recording medium is inserted in the guide groove and is manually moved in a direction along the guide groove, the code reader comprising:
- an image input section configured to pick up an image of the code as it is moved and to process the image; and
- a data read section configured to read the data from the image which includes the code and is output from the image input section;
- wherein the image processing includes a one-dimensional filter process; and
- wherein a moving direction of the card recording medium is matched with a direction of the one-dimensional filter process.

12. A code reader which has a predetermined guide groove and is configured to optically read an optically readable code from a predetermined side of a card recording medium on which data is recorded as the optically readable code along the side, when the card recording medium is inserted in the guide groove and is manually moved in a direction along the guide groove, the code reader comprising:
- an image input section configured to pick up an image of the code as it is moved and to process the image; and
- a data read section configured to read the data from the image which includes the code and is output from the image input section;
- wherein the code is arranged in a plurality of blocks arranged in at least a moving direction of the card recording medium;
- wherein each block comprises an arrangement of:
  - a data region including the data;
  - a marker region including a marker to recognize the block; and
  - a block address region including a block address to identify the block individually in accordance with a predetermined positional relationship; and
- wherein the predetermined positional relationship is configured to satisfy:

$$N+1=W/B$$

where:
- N denotes number of blocks from which the data is readable during an image pick-up period,
- W denotes an image pick-up region width on the card recording medium in the moving direction of the card recording medium, and
- B denotes a block width on the card recording medium in the moving direction of the card recording medium.

* * * * *